United States Patent
Benjamin

(10) Patent No.: US 8,162,259 B2
(45) Date of Patent: Apr. 24, 2012

(54) AIRCRAFT EJECTION SEAT WITH PASSIVE LIMB RETENTION

(75) Inventor: Jeffrey John Benjamin, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 392 days.

(21) Appl. No.: 12/566,045

(22) Filed: Sep. 24, 2009

(65) Prior Publication Data

US 2011/0068229 A1    Mar. 24, 2011

(51) Int. Cl.
*B64D 25/115*     (2006.01)
(52) U.S. Cl. .................................. 244/122 AG
(58) Field of Classification Search ............... 244/122 R, 244/122 AG
See application file for complete search history.

(56) References Cited

U.S. PATENT DOCUMENTS

| | | | |
|---|---|---|---|
| 4,028,948 A | 6/1977 | Frost et al. | |
| 4,179,086 A | 12/1979 | Yamada | |
| 4,215,835 A * | 8/1980 | Wedgwood | 244/122 AG |
| 4,247,064 A | 1/1981 | Schulman et al. | |
| 4,359,200 A | 11/1982 | Brevard et al. | |
| 4,465,250 A | 8/1984 | Cummings | |
| 4,482,112 A | 11/1984 | Cummings | |
| 4,592,523 A * | 6/1986 | Herndon | 244/122 AG |
| 4,651,951 A * | 3/1987 | McFarlane | 244/122 AG |
| 4,667,902 A | 5/1987 | Zenobi | |
| 5,318,252 A | 6/1994 | Aronne | |

FOREIGN PATENT DOCUMENTS

GB            1099490 A    1/1968

* cited by examiner

*Primary Examiner* — Galen Barefoot
(74) *Attorney, Agent, or Firm* — Jerry J. Holden; John D. Titus

(57) ABSTRACT

An aircraft ejection seat includes a passive limb retention system. The limb retention system comprises a primary lanyard that forms a loop around the crewmember's footwell and a secondary lanyard that is releasably attached to a medial portion of the loop in the primary lanyard. Upon initiation, as the ejection seat is propelled out of the aircraft, the primary and secondary lanyards simultaneously close the lanyard loop around the crewmember's leg from both ends until the lanyard loop contacts the crewmember's leg. Once the lanyard loop is closed around the crewmember's leg, the secondary lanyard releases, allowing the primary lanyard to continue to tighten around the crewmember's leg until the shear fastener shears and the ejection seat exits the aircraft.

19 Claims, 3 Drawing Sheets

AIRCRAFT EJECTION SEAT WITH PASSIVE LIMB RETENTION

BACKGROUND OF THE INVENTION

This invention relates generally to aircraft ejection seats, and more particularly to means for positioning and restraining the limbs of a crewmember in an ejection seat during ejection.

High performance military and other aircraft are frequently equipped with systems to effect escape of crewmembers when a stricken aircraft is about to crash. The most common such escape system is the open ejection seat, which, upon initiation propels itself and its occupant through the aircraft canopy and away from the aircraft.

Upon ejection from an aircraft, however, a crewmember in an open ejection seat may be subjected to an extremely high wind blast. This wind blast, often on the order of several hundred knots, can cause the crewmember's limbs to flail, resulting in severe injuries. In order to reduce flail injuries, various devices have been proposed which utilize combinations of straps, nets, or bladders to restrain the arms and legs of a crewmember in an aircraft ejection seat during ejection. One highly effective leg restraint system currently fielded by the United States military comprises a cable or lanyard which is attached to the airframe by means of a shear fastener. The other end of the lanyard is attached to the crewmember's ankles by means of leg garters which must be "hooked in" as the crewmember prepares for flight. The lanyard passes through a one-way jam-cleat or "snubber." When the ejection seat is activated, as the ejection seat moves up and out of the aircraft, movement of the ejection seat causes the lanyard to be pulled through the snubber. This draws the leg garters in against the seat thereby restraining the crewmember's legs. At a predetermined threshold, the shear fastener breaks thereby arresting any further inward motion of the crewmember's legs. The snubber then retains the lanyard in position as the ejection seat exits the aircraft.

Although highly effective, the prior art leg restraint system is considered an "active" system in that it requires to the crewmember to "hook in" in order for it to be readied for flight. Accordingly, the prior art leg restraint may be improperly attached or ignored by the crewmember rendering it ineffective. Various "passive" limb retention systems have been proposed to remedy this problem. U.S. Pat. No. 4,247,064 to Schulman et al. discloses an ejection seat including a pair of rigid hooks that are actuated by gas generators to capture and restrain the crewmember's legs during ejection. U.S. Pat. No. 4,359,200 to Brevard et al. discloses an ejection seat with a plurality of inflatable bladders that inflate to capture and restrain the crewmember's limbs. U.S. Pat. No. 4,667,902 to Zenobi discloses an ejection seat equipped with a pair of nets that deploy to capture and restrain the crewmember's arms during ejection. Each of the foregoing inventions adds substantial complexity and weight to the ejection seat. Consequently, the "active" leg restraint system has remained the standard in spite of its acknowledged drawbacks. Accordingly, what is needed is a "passive" limb retention system that is as lightweight, simple and reliable as the current "active" system, but without the drawback of requiring the crewmember to "hook in" for it to be readied for flight.

SUMMARY OF THE INVENTION

The present invention comprises an ejection seat with a limb retention system. According to an illustrative embodiment, the limb retention system comprises a primary lanyard that forms a loop around the footwell into which the crewmember's leg is inserted when the crewmember takes his/her ordinary position for flight. The fixed end of the primary lanyard is attached to the aircraft seat near the crewmember's ankle. The lanyard passes through a snubber and is operatively attached at the end to the airframe by means of a conventional shear fastener. As the ejection seat exits the aircraft, the loop in the primary lanyard is drawn around and restrains the crewmember's leg in a manner similar to the prior art "active" leg restraint system. Because the speed at which the loop in the primary lanyard closes around the crewmember's leg is limited by speed of the ejection seat, however, a single lanyard loop cannot be made to close quickly enough to capture the leg of a $5^{th}$ percentile crewmember without making it close too quickly for a $95^{th}$ percentile crewmember. Accordingly, the illustrative embodiment includes a secondary lanyard that is releasably attached to a medial portion of the loop in the primary lanyard. The secondary lanyard passes through a fairlead near the attachment point of the primary lanyard and attaches to the primary lanyard near the snubber. Upon initiation, as the ejection seat is propelled out of the aircraft, the shear fastener causes the primary lanyard to be drawn through the snubber. This causes the primary and secondary lanyards to simultaneously close the lanyard loop around the crewmember's leg from both ends until the lanyard loop contacts the crewmember's leg. Once the lanyard loop is closed around the crewmember's leg, the secondary lanyard releases, allowing the primary lanyard to continue to tighten around the crewmember's leg until the shear fastener shears and the ejection seat exits the aircraft.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
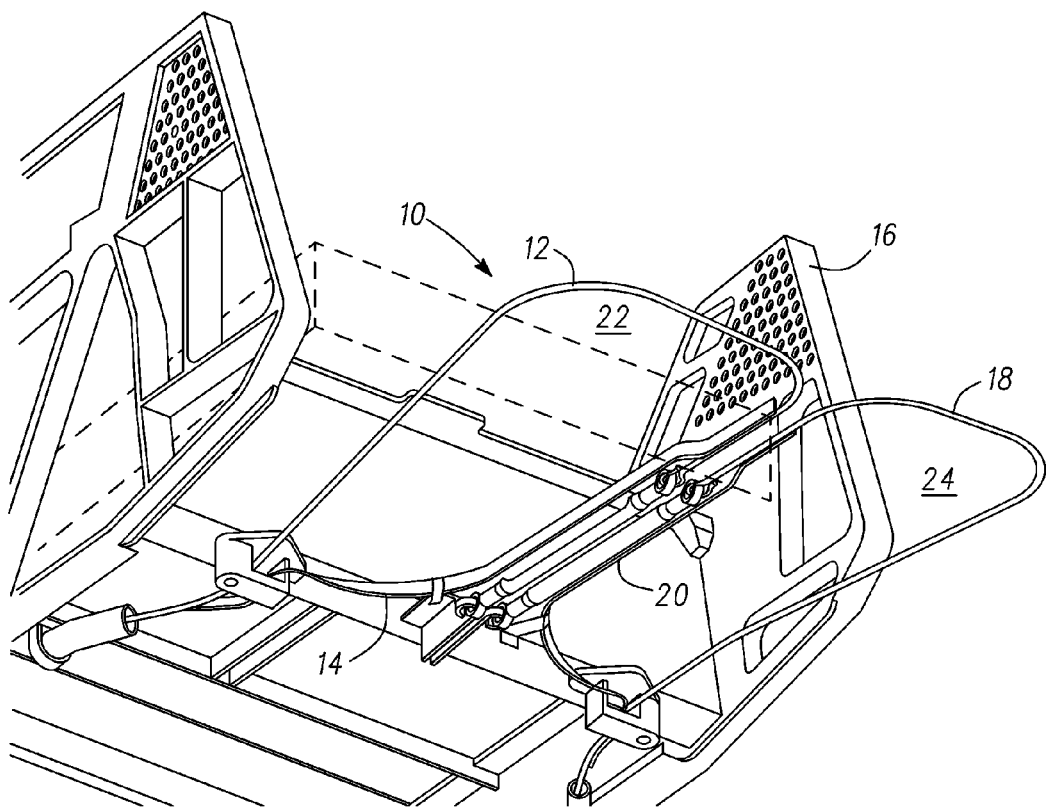
FIG. 1 is a bottom perspective view of an aircraft ejection seat incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to FIG. 1 a leg restraint system 10 incorporating features of the present invention comprises a primary lanyard 12 and a secondary lanyard 14 disposed on the starboard side of the ejection seat 16. Similarly, a primary lanyard 18 and secondary lanyard 20 are disposed on the port side of ejection seat 16. Primary lanyard 12 and primary lanyard 18 form lanyard loops 22 and 24 each of which is attached by breakaway fasteners to the crewmember's footwell (not shown) and therefore are "passive" in that they require no action on the crewmember's part to ready them for flight.

Figures 2, 3:
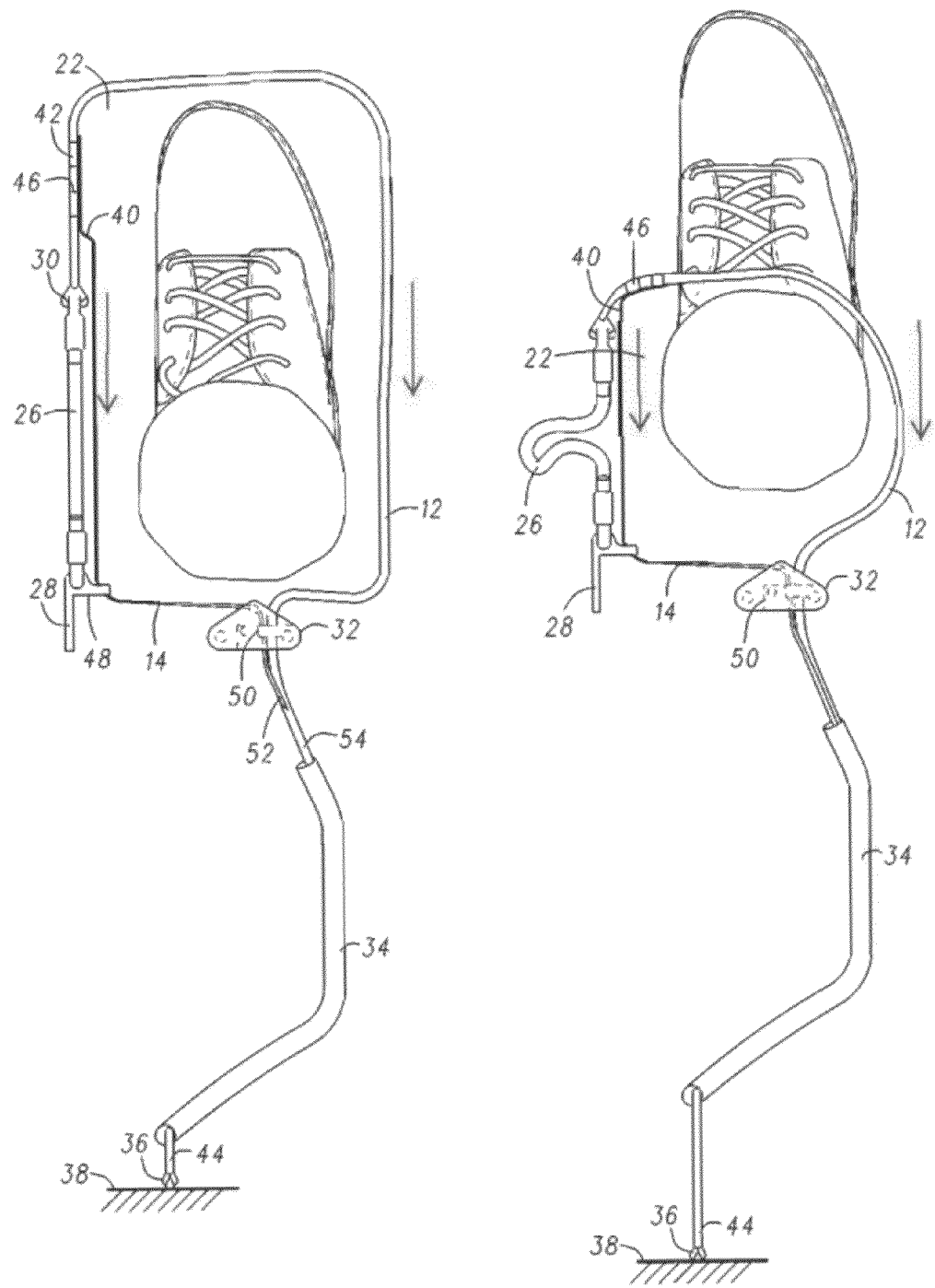
FIG. 2 is a top plane view of a leg restraint system incorporating features of the present invention in a stowed condition.
FIG. 3 is the leg restraint system of FIG. 2 in a partially retracted condition.

FIG. 2 shows the principal elements of the starboard leg restraint system 10. The port leg restraint system is essentially a mirror image of the starboard leg restraint system and therefore will not be discussed in detail herein. Primary lanyard 12 is attached to ejection seat 16 by means of a shock cord 26 which is attached to bracket 28. Bracket 28, in turn, is attached (e.g., by retractable clevis pins) to the bottom of the seat pan of ejection seat 16. Primary lanyard 12 forms a lanyard loop 22 which, as discussed hereinbefore, is releasably attached by breakaway fasteners to the perimeter of the crewmember's footwell. Primary lanyard 12 passes through a conventional one-way snubber 32, a chafing sheath 34 and finally terminates at the proximal end 44. Proximal end 44 is operatively attached to airframe 38 by means of a conventional shear fastener 36, which is attached to the vertical seat actuator (not shown). The vertical seat actuator, in turn, is attached to the seat rails attached to airframe 38. Although in the illustrative embodiment proximal end 44 of primary lanyard 12 is indirectly attached to airframe 38 via the vertical seat actuator, which enables the lanyard to be operatively attached to airframe 38 without modification to the airframe itself, other means of securing the primary lanyard 12, including direct attachment of the shear fastener to the airframe may be utilized without departing from the scope of the invention. Primary lanyard 12 may be of any conventional material used for similar purposes, however, in the illustrative embodiment primary lanyard 12 comprises a polyester line having a working tensile strength of approximately 2,000 lbs.

Secondary lanyard 14 is attached at its distal end 40 to primary lanyard 12 at a medial location 42 along lanyard loop 22. Secondary lanyard 14 may be of construction equally sturdy as primary lanyard 12, however, to save weight, the secondary lanyard is preferably made of lighter construction. In the illustrative embodiment, secondary lanyard comprises 0.20 inch wide nylon webbing which, for reasons discussed more fully more hereinafter is attached to primary lanyard 12 at medial location 42 by means of a frangible seam 46. Frangible seam 46 may be of any suitable construction including hook and loop fasteners, adhesives, or other low-strength fasteners, but in the illustrative embodiment frangible seam 46 comprises a type 3 cord having a tensile strength of approximately 31 lbs. Secondary lanyard 14 passes through a fairlead 48 formed in bracket 28 and second fairlead 50 proximal snubber 32. The proximal end 52 of secondary lanyard 14 is then attached to primary lanyard 12 at an intermediate location 54 located along primary lanyard 12 between snubber 32 and proximal end 44.

Figure 4:
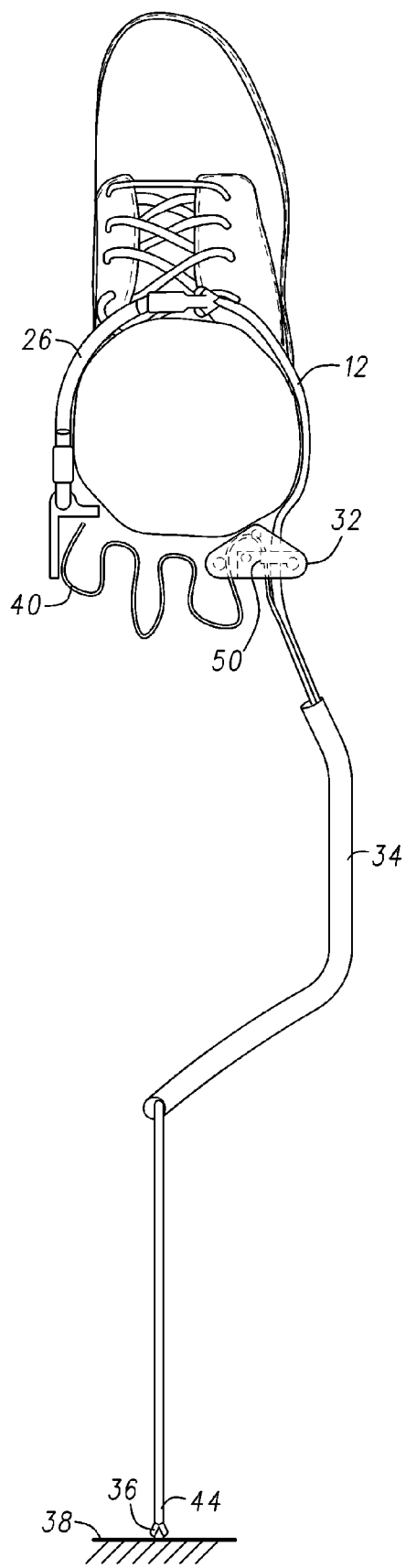
FIG. 4 is the leg restraint system of FIG. 2 in a fully retracted condition.

With reference to FIGS. 2-4, when ejection seat 16 is activated, because proximal end 44 of primary lanyard 12 is operatively attached to airframe 38, movement of ejection seat 16 away from the aircraft causes primary lanyard 12 to be drawn through snubber 32. Because the proximal end 52 of secondary lanyard 14 is attached to primary lanyard 12, movement of primary lanyard 12 through snubber 32 simultaneously causes secondary lanyard 14 to be drawn through fairleads 48 and 50.

With particular reference to FIGS. 3 and 4, the action of primary lanyard 12 being drawn through snubber 32 and secondary lanyard 14 being drawn through fairlead 50 causes lanyard loop 22 to simultaneously close from both ends (as opposed to closing merely from one end if secondary lanyard 14 were not present). This action causes lanyard loop 22 to capture the crewmember's leg even if the crewmember is $5^{th}$ percentile or below in size.

Once the crewmember's leg has been captured by lanyard loop 22, primary lanyard 12 continues to be drawn through snubber 32 which also causes secondary lanyard 14 to be drawn through fairlead 50 until the tension on secondary lanyard 14 exceeds the breaking strength of frangible seam 46. Frangible seam 46 then ruptures releasing distal end 40 of secondary lanyard 14 from primary lanyard 12. Primary lanyard 12 then continues to pass through snubber 32 drawing the crewmember's leg tightly against ejection seat 16 until shear fastener 36 ruptures releasing primary lanyard 12 from airframe 38. Shock cord 26 damps the shock load as primary lanyard 12 is fully tightened, thereby reducing the possibility of injury to the crewmember. Once shear fastener 36 has ruptured and is no longer providing tension on primary lanyard 12, snubber 32 locks to prevent primary lanyard 12 from reversing direction. Shock cord 26 thereafter maintains tension in primary lanyard 12 to hold the crewmember's legs tightly against ejection seat 16.

Although certain illustrative embodiments and methods have been disclosed herein, it will be apparent from the foregoing disclosure to those skilled in the art that variations and modifications of such embodiments and methods may be made without departing from the invention. For example, in the illustrative embodiment the secondary lanyard comprises a nylon tape that is held to the primary lanyard by a frangible seam, however, the secondary lanyard itself could be designed to rupture at a predetermined tension without departing from the scope of the present invention. Additionally, although in the illustrative embodiment the primary and secondary lanyards are retracted by a shear fastener operatively attached to the airframe, other means of actuation, such as pyrotechnic or pneumatic actuators could be employed to simultaneously retract the primary and secondary lanyards. Accordingly, it is intended that the invention should be limited only to the extent required by the appended claims and the rules and principles of applicable law. As used herein, forward, backward, up, down or similar terms of direction are relative to the occupant seated in the ejection seat, unless otherwise stated. Additionally, as used herein, unless otherwise specifically defined, the terms "substantially" or "generally" when used with mathematical concepts or measurements mean within ±10 degrees of angle or within 10 percent of the measurement, whichever is greater.

What is claimed is:

1. An aircraft ejection seat for supporting an occupant in an airframe comprising:
    a seat frame having a seat pan and a support structure extending below the seat pan;
    a primary lanyard, said primary lanyard having a distal end attached to said seat frame and a bight portion extending in a forward direction below the seat pan, the bight portion adapted to restrain the occupant's limb passing through the bight portion, said primary lanyard further comprising a proximal end;
    a secondary lanyard having a distal end attached to the bight portion of said primary lanyard said secondary lanyard further comprising a proximal end; and
    means for simultaneously retracting the proximal end of said primary lanyard and the proximal end of said secondary lanyard toward said seat frame to draw the bight portion close around the occupant's limb.

2. The aircraft ejection seat of claim 1, wherein:
    said secondary lanyard includes a frangible element for releasably attaching said secondary lanyard to the bight portion of said primary lanyard.

3. The aircraft ejection seat of claim 2, wherein:
said frangible element comprises a weakened region of said secondary lanyard.

4. The aircraft ejection seat of claim 2, wherein:
said frangible element comprises a frangible seam disposed between said secondary lanyard and the bight portion of said primary lanyard, said frangible seam being adapted to fail at a predetermined load.

5. The aircraft ejection seat of claim 4, wherein:
said predetermined load is less than the maximum tensile load applied to said primary lanyard.

6. The aircraft ejection seat of claim 1, wherein:
the proximal end of said secondary lanyard is operatively attached to the proximal end of said primary lanyard.

7. The aircraft ejection seat of claim 1, wherein:
said secondary lanyard passes through a fairlead proximal the distal end of said primary lanyard.

8. The aircraft ejection seat of claim 1, wherein:
said primary lanyard is retracted along a first side of the occupant's limb; and
said secondary lanyard is attached to the bight portion of said primary lanyard on an opposite side of the occupant's limb.

9. The aircraft ejection seat of claim 1, wherein:
said means for simultaneously retracting the proximal end of said primary lanyard and the proximal end of said secondary lanyard comprises operatively attaching the proximal end of said primary lanyard and the proximal end of said secondary lanyard to the airframe.

10. The aircraft ejection seat of claim 1, wherein:
the bight portion of said primary lanyard extends at least 25-35 inches forward of said ejection seat.

11. The aircraft ejection seat of claim 1, wherein:
the distal end of said primary lanyard is attached to the seat frame by means of an elastic member.

12. An ejection seat for supporting an occupant in an airframe and propelling the occupant from the airframe in an emergency, said ejection seat comprising:
a seat frame having a seat pan and a support structure extending below the seat pan, said seat frame further including propulsion means acting on said seat frame for propelling said ejection seat away from said airframe;
a primary lanyard, said primary lanyard having a distal end attached to said seat frame and a bight portion adapted to restrain the occupant's limb passing through the bight portion, said primary lanyard further comprising a proximal end, the proximal end of said primary lanyard being operatively attached to said airframe; and
a secondary lanyard having a distal end attached to the bight portion of said primary lanyard said secondary lanyard further comprising a proximal end, the proximal end of said secondary lanyard being operatively attached to the proximal end of the primary lanyard.

13. The ejection seat of claim 12, further comprising:
a snubbing cleat for gripping said primary lanyard to prevent the release of tension applied to said primary lanyard upon ejection.

14. The ejection seat of claim 12, wherein:
the proximal end of said primary lanyard is operatively attached to said airframe by a frangible member.

15. The ejection seat of claim 12, wherein:
the distal end of said secondary lanyard is attached to the bight portion of said primary lanyard by a frangible member.

16. The aircraft ejection seat of claim 15, wherein:
said frangible member comprises frangible stitching adapted to fail at a predetermined load.

17. The aircraft ejection seat of claim 15, wherein:
said frangible member comprises an adhesive.

18. The aircraft ejection seat of claim 15, wherein:
said frangible member detaches the distal end of said secondary lanyard from the bight portion of said primary lanyard at a predetermined load that is less than the maximum tensile load applied to said primary lanyard.

19. In an aircraft ejection seat of the type having a primary lanyard for retaining an occupant's limb by means of a bight portion that is closed around the occupant's limb by retracting the primary lanyard into a first fitting located on a first side of the occupant's limb, the improvement comprising:
a secondary lanyard having a distal end attached to the bight portion of said primary lanyard by a frangible member adapted to fail at a predetermined load that is less than the maximum tensile force applied to said primary lanyard, said secondary lanyard passing through a second fitting located on a side opposite the first side of the occupant's limb, said secondary lanyard and terminating at a proximal end that is operatively attached to said primary lanyard, so that as said primary lanyard is retracted to close the bight portion around the occupant's limb from the first side, said secondary lanyard is simultaneously retracted thereby drawing the bight portion around the occupant's limb from the second side until the frangible member fails and detaches the distal end of said secondary lanyard from the bight portion of said primary lanyard, whereupon the bight portion is drawn around the occupant's limb from the first side only.

* * * * *